UNITED STATES PATENT OFFICE.

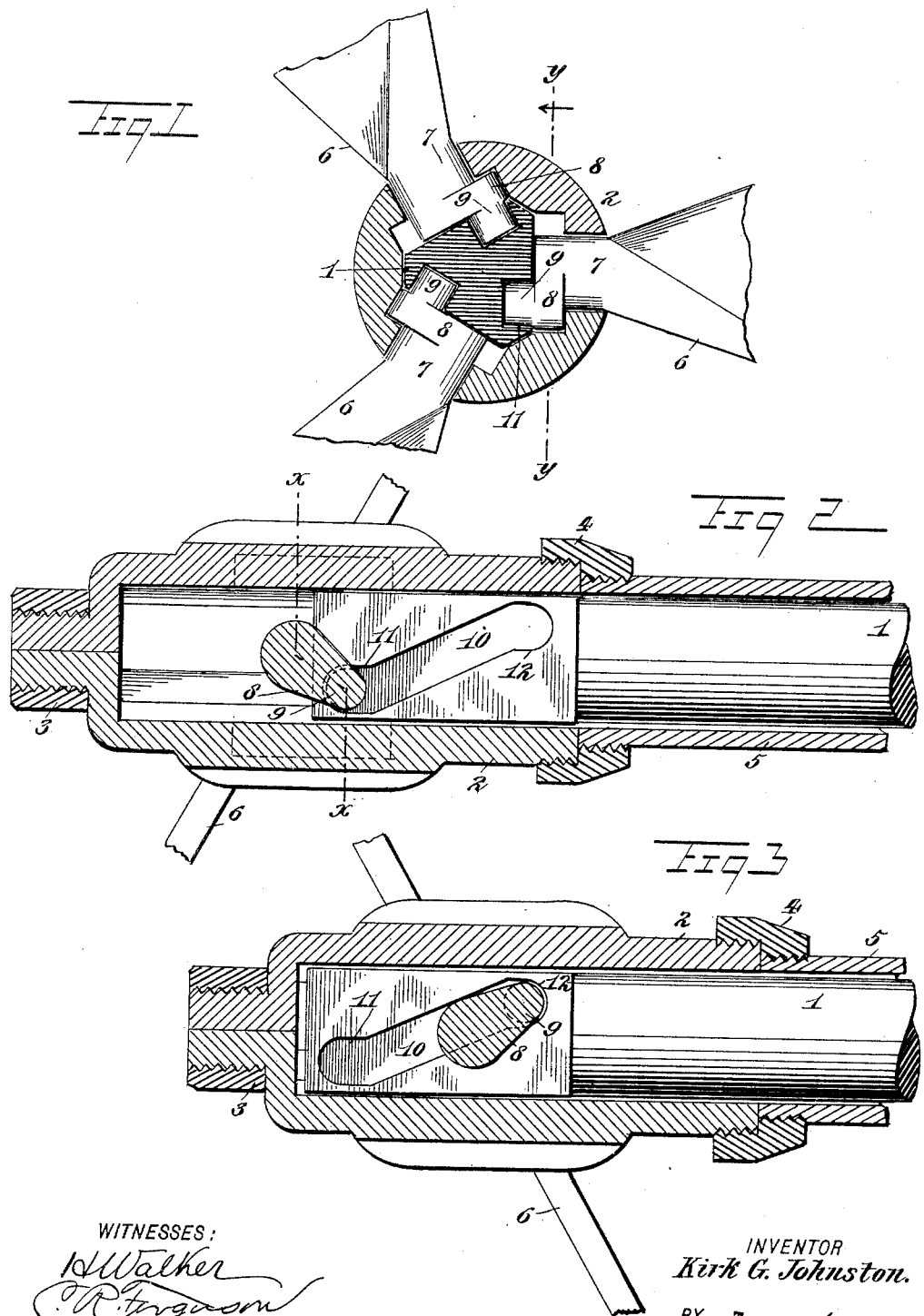

KIRK GARDNER JOHNSTON, OF PIQUA, OHIO.

PROPELLER.

SPECIFICATION forming part of Letters Patent No. 675,563, dated June 4, 1901.

Application filed October 19, 1900. Serial No. 33,616. (No model.)

*To all whom it may concern:*

Be it known that I, KIRK GARDNER JOHNSTON, a citizen of the United States, and a resident of Piqua, in the county of Miami and State of Ohio, have invented a new and Improved Propeller, of which the following is a full, clear, and exact description.

This invention relates to improvements in propellers for vessels; and the object is to provide a simple means for shifting the angle of the blades and locking the same for propelling the vessel forward or backward without reversing the direction of rotation of the propeller-shaft.

I will describe a propeller embodying my invention and then point out the novel features in the appended claims.

Reference is to be had to the accompanying drawings, forming a part of this specification, in which similar characters of reference indicate corresponding parts in all the figures.

Figure 1 is a section on the line $x$ $x$ of Fig. 2 of a propeller embodying my invention. Fig. 2 is a section substantially on the line $y$ $y$ of Fig. 1; and Fig. 3 is a similar section to Fig. 2, but showing the parts in a reverse position.

Referring to the drawings, 1 designates the propeller-shaft, upon the outer end of which is mounted to slide longitudinally a sleeve 2. For convenience in assembling the parts this sleeve 2 is made in horizontal sections, which when assembled are secured together at the outer end by means of a nut 3, engaging with tapped extensions of the sections, and at the inner end by means of a nut 4, which also has screw-threaded engagement with a tubular shaft 5, surrounding the propeller-shaft and adapted to connect at its end within the vessel with a suitable means for moving said tubular shaft and the sleeve longitudinally of the propeller-shaft. This means it is not deemed necessary to show herein.

The propeller-blades 6 (here shown as three in number) are provided with journal portions 7, which have bearings in openings in the sleeve 2, as plainly indicated in Fig. 1. The inner ends of these journal portions are provided with crank extensions 8, the wrist-pins 9 of which engage in channels 10, formed in the propeller-shaft 1. The portion of said propeller-shaft within the sleeve and within which these channels are formed is made angular in cross-section, providing flat surfaces upon which the inner ends of the journals of the blades may ride. The body portions of the channels 10 are extended diagonally across the flat surfaces of the shaft 1, and they terminate at the ends in extensions 11 12, the side walls of which are parallel with the axis of the shaft. These extensions 11 and 12 are designed to receive the wrist-pins 9 when the sleeve 2 is in either of its extreme positions, and the side walls of said extensions, being parallel with the axis of the shaft, will serve to lock the blades as angularly adjusted, whereas should the channels be diagonal from end to end it is obvious that a slight rotation of the shaft 1 relatively to the sleeve would cause a deflection of the blades.

In operation when the sleeve 2 is moved to its outer position, as indicated in Fig. 2, the propeller-blades will be deflected transversely to the position to move the vessel forward as the propeller-shaft is rotated. When it is desired to move the vessel backward, the sleeve 2 is to be drawn inward on the propeller-shaft, so that the walls of the channels 10, engaging with the wrist-pins, will reverse the transverse angle of the blades, as indicated in Fig. 3.

Having thus described my invention, I claim as new and desire to secure by Letters Patent—

1. In a propeller, a propeller-shaft provided at its outer end with channels, the body portions of which are arranged diagonally, and terminate at the ends in extensions the side walls of which are parallel with the axis of the shaft, a sleeve mounted to move longitudinally of the shaft, blades having bearings in said sleeve, and crank wrist-pins on the blades engaging in said channels, substantially as specified.

2. In a propeller, a propeller-shaft having its outer end made angular in cross-section providing flat surfaces, diagonally-disposed channels in said flat surfaces, terminating in extensions having opposite walls parallel with the axis of the shaft, a sleeve made in longitudinal sections, means for securing the sections together, propeller-blades having bearings in said sleeve, crank portions on said blades, and wrist-pins on the crank portions for engaging in said channels, substantially as specified.

In testimony whereof I have signed my name to this specification in the presence of two subscribing witnesses.

KIRK GARDNER JOHNSTON.

Witnesses:
C. B. JAMISON,
L. H. ROUZER, Jr.